Patented Dec. 15, 1931

1,836,346

UNITED STATES PATENT OFFICE

EDWARD THOMAS, OF NEW YORK, N. Y.

COATED AND MOLDABLE MATERIAL

No Drawing. Application filed June 16, 1928, Serial No. 286,067, and in Great Britain November 11, 1927.

This invention relates to coated and to moldable materials and is herein described as applied to the production of plastic compositions of asbestos bound by a few per cent of oil which may be an unsaturated oil such as wood oil using say less than fifteen per cent.

According to the procedure for making the final product the asbestos fiber is agitated in much more than its weight of water so that a freely flowing pulp is made, or one that is nearly freely flowing. The pulp is so agitated with the oil as to finely disseminate the latter with the result that the oil is adsorbed upon the asbestos. The pulp is then further agitated with a small amount of a suitable chemical, such as chlorine, to react with the oil. When wood-oil coated asbestos and chlorine react under these conditions it is found that the oil-coated asbestos may be stored unchanged for long periods under water, but upon pressing to expel the water the asbestos becomes firmly bound together.

It has also been found that substances not normally having an affinity for oil may be given such affinity and be similarly bound.

Other features and advantages will hereinafter appear.

*Example 1.*—Asbestos float was agitated in several times its weight of warm water by a Hamilton-Beach bar mixer in a round jar and then there was added during further agitation about eight per cent of its weight of Chinese wood oil. This formed a plastic material when drained. It could be pressed in a mold provided with drainage and baked.

*Example 2.*—Asbestos float was similarly agitated in warm water with the same proportion of wood oil. Then there was added enough of a faintly alkaline solution of chlorine in a ten per cent solution of common salt to provide available chlorine equal to two per cent of the oil. The chlorine-treated oil-coated asbestos was stored for days under water unchanged, but other lots dried out were water-proof, whether dried without pressure to form a highly porous heat-insulating material, or under high pressure to form electrical insulating material.

*Example 3.*—The same procedure was carried out except that a slightly acid solution of potassium permanganate was substituted for the chlorine solution. Similar but darker products were obtained.

*Example 4.*—Example 2 was repeated except that linseed oil was substituted for the wood oil with a generally similar result.

*Example 5.*—Example 3 was repeated except that linseed oil was substituted for the wood oil with a generally similar result.

*Example 6.*—Ground silica gel was treated like the asbestos of Example 1 and was found to have effectively absorbed the oil after the addition of National Aniline and Chemical Co. safranine A equal to about a quarter of one per cent of the gel.

*Example 7.*—Example 6 was repeated using methylene blue B. B. instead of the safranine A with a similar result.

*Example 8.*—Example 6 was repeated using auromine O instead of the safranine A with a similar result.

*Example 9.*—One-half ounce of lithopone was agitated with thirty three drops of the wood oil in three ounces of hot water. Then there was added half an ounce of water containing six drops of strong permanganate of potash solution and six drops of a ten per cent sulphuric acid. This was used as a pigment to fill engraved hollows in brass matrices.

*Example 10.*—Example 9 was repeated using the chlorine solution of Example 2 instead of permanganate yielding a lighter colored material.

Having thus described certain embodiments of my invention what I claim is:

1. The process of uniformly coating asbestos with less than fifteen per cent of oil which consists in agitating a flowing aqueous pulp of the asbestos with the oil so as to disseminate the oil through the water of the pulp with the result that the asbestos evenly takes up the oil.

2. The process of making a moldable and self-hardening asbestos material which consists in agitating a flowing aqueous pulp of the asbestos with an unsaturated oil, further agitating the pulp with a chemical adapted to react with the oil so as to produce a self-binding material upon drying.

3. The process of making a self-hardening asbestos material which consists in agitating a flowing aqueous pulp of the asbestos with an unsaturated oil, further agitating the pulp with a chemical adapted to react with the oil so as to produce a self-hardening material, and pressing the material to mold it and dry it.

4. The process of making a self-hardening asbestos material which consists in agitating a flowing aqueous pulp of the asbestos with an unsaturated oil, further agitating the pulp with available chlorine so as to produce a self-hardening material, and pressing the material to mold it and dry it.

5. The process of making a self-hardening asbestos material which consists in agitating a flowing aqueous pulp of the asbestos with wood oil, further agitating the pulp with available chlorine, and draining the material.

6. The process of making a self-hardening asbestos material which consists in agitating a flowing aqueous pulp of the asbestos with wood oil, further agitating the pulp with available chlorine, and pressing the material to mold it and dry it.

7. The process of making a self-hardening asbestos material which consists in agitating a flowing aqueous pulp of the asbestos with wood oil, further agitating the pulp with a chemical adapted to react with the oil so as to produce a self-hardening material, and draining the material.

8. A solid fine material suspended in water and coated with unsaturated oil which has been caused to take up a chemical element and adapted to bind itself into a solid mass upon drying, after separation from water.

EDWARD THOMAS.